United States Patent
Perry

(10) Patent No.: US 10,744,457 B2
(45) Date of Patent: Aug. 18, 2020

(54) ELECTROCHEMICAL SEPARATOR

(71) Applicant: Hamilton Sundstrand Corporation, Charlotte, NC (US)

(72) Inventor: Michael L. Perry, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 134 days.

(21) Appl. No.: 15/658,848

(22) Filed: Jul. 25, 2017

(65) Prior Publication Data
US 2019/0030485 A1 Jan. 31, 2019

(51) Int. Cl.
*B01D 53/32* (2006.01)
*C25B 3/04* (2006.01)

(52) U.S. Cl.
CPC .............. *B01D 53/326* (2013.01); *C25B 3/04* (2013.01); *B01D 2257/504* (2013.01)

(58) Field of Classification Search
CPC ............ B01D 53/326; B01D 2257/504; B01D 2256/22
See application file for complete search history.

(56) References Cited

U.S. PATENT DOCUMENTS

| 2011/0114504 A1* | 5/2011 | Sivasankar | ............... | C25B 1/02 205/455 |
| 2013/0058857 A1* | 3/2013 | Stern | .................... | B01D 53/326 423/415.1 |
| 2014/0370403 A1* | 12/2014 | Narayan | .................. | H01M 8/08 429/418 |
| 2017/0113182 A1* | 4/2017 | Voskian | ............... | B01D 53/326 |
| 2018/0028962 A1* | 2/2018 | Hatton | .................... | C01B 32/50 |

FOREIGN PATENT DOCUMENTS

RU 2342742 12/2008

OTHER PUBLICATIONS

Hoober, Lena & Krishnamoorthy, Sankarganesh & Yang, Bo & Murali, Advaith & Nirmalchandar, Archith & Prakash, G. & Narayan, Sri. A New Michael-Reaction-Resistant Benzoquinone for Aqueous Organic Redox Flow Batteries. Journal of the Electrochemical Society. 164. A600-A607. Jan. 31, 2017 (Year: 2017).*
Gurkan, B., Simeon, F., and Hattan, T.A. (2015). Quinone reduction in ionic liquids for electrochemical CO2 seperation. ACS Sustainable Chem. Eng. vol. 3. 2015. pp. 1394-1405.
Rheinhardt, J.H., Singh, P., Tarakeshwar, R and Buttry, D.A. (2017). Electrochemical capture and release of carbon dioxide. ACS Energy Lett. vol. 2. 2017. pp. 454-461.
Stern, M.C., Simeon, F., Hammer, T., Landes, H., Herzog, H.J., and Hatton, T.A. (2011). Electrochemically mediated separation for carbon capture. Energy Procedia vol. 4. 2011. pp. 860-867.

* cited by examiner

*Primary Examiner* — Steven A. Friday
(74) *Attorney, Agent, or Firm* — Carlson, Gaskey & Olds, P.C.

(57) ABSTRACT

An electrochemical separator includes an electrochemical reactor that has an anode and a cathode. An aqueous working liquid circulates through the electrochemical reactor. The aqueous working liquid contains water and electrochemically active organic molecules dissolved in the water. The electrochemically active organic molecules are quinones functionalized with one or more ionic groups.

20 Claims, 1 Drawing Sheet

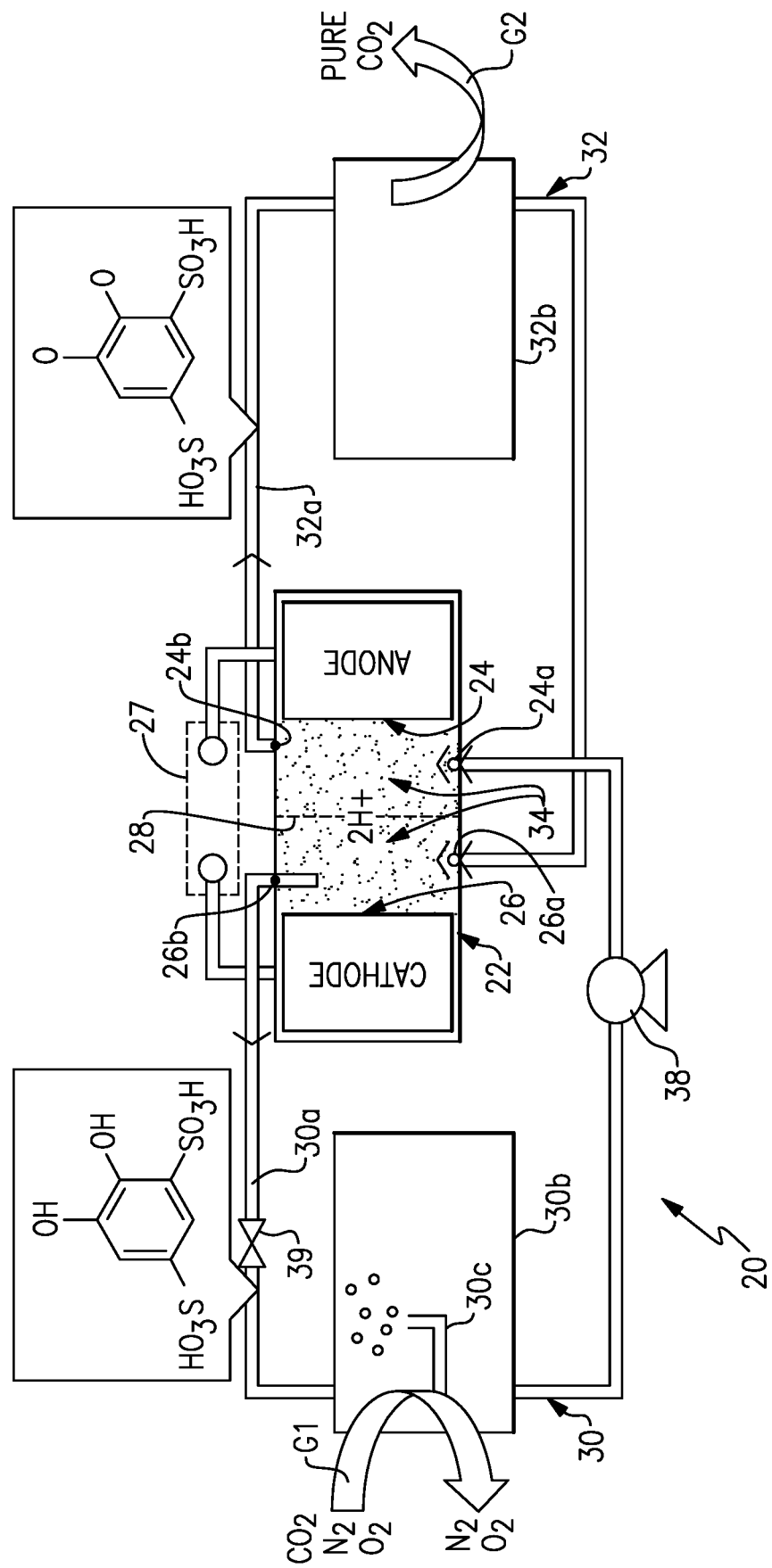

ELECTROCHEMICAL SEPARATOR

BACKGROUND

Various types of systems can be used to separate carbon dioxide from a mixed gas stream. Such systems include pressure-swing absorbers and temperature-swing absorbers. However, these systems are relatively complex, consume high amounts of energy, and are inefficient because of the energy required to rejuvenate the absorber beds as well as the large pressure drops through absorber beds.

Another type of system involves electrochemical reduction and oxidation of carbon dioxide. In such systems an electrochemical cell is used to electrochemically reduce carbon dioxide in one half-cell and electrochemically oxidize carbonate anions in the other half-cell. Although physically viable, neither electrochemical reaction is energetically favorable, requiring platinum-group metal catalysts to proceed. Even with catalysts, the reactions have low energy efficiency. Additionally, the charge carrier, carbonate anions, is somewhat large and results in ohmic losses from transport through an anion exchange membrane.

More recently, electrochemically active organic molecules, such as quinones, have been dissolved in supporting electrolytes and used for oxidation and reduction reactions to separate carbon dioxide. However, the electrolytes are often volatile, flammable, or unstable, and quinone has very limited solubility in the electrolytes—all limiting practical application of quinones.

SUMMARY

An electrochemical separator according to an example of the present disclosure includes an electrochemical reactor that has an anode and a cathode, and an aqueous working liquid for circulation through the electrochemical reactor. The aqueous working liquid contains water and electrochemically active organic molecules dissolved in the water. The organic molecules are functionalized with one or more ionic groups.

In a further embodiment of any of the foregoing embodiments, the electrochemically active organic molecules are polar molecules in either the reduced or oxidized state and are non-polar molecules in the other of the reduced or oxidized state.

In a further embodiment of any of the foregoing embodiments, the reactor includes an ion-conducting membrane.

In a further embodiment of any of the foregoing embodiments, the ion-conducting membrane includes an ion-exchange polymer.

In a further embodiment of any of the foregoing embodiments, the electrochemically active organic molecules are quinone and are selected from the group consisting of benzoquinone, naphthoquinone, anthraquinone, and combinations thereof.

In a further embodiment of any of the foregoing embodiments, the aqueous working liquid has a concentration of the electrochemically active organic molecules of 1 mol/L to 4 mol/L (moles per liter).

In a further embodiment of any of the foregoing embodiments, the aqueous working liquid has a concentration of the electrochemically active organic molecules of at least 1.5 mol/L (moles per liter).

In a further embodiment of any of the foregoing embodiments, the electrochemically active organic molecules are benzoquinone disulfonic acid.

An electrochemical separator according to an example of the present disclosure includes an electrochemical reactor that has an anode that has an anode inlet and an anode outlet, a cathode that has a cathode inlet and a cathode outlet, and an ion-conducting membrane separating the anode and the cathode. A sorption circuit fluidly connects with the cathode outlet and the anode inlet. The sorption circuit has a polar gas collector section. A desorption circuit fluidly connects the anode outlet and the cathode inlet. The desorption circuit includes a polar gas discharge section. Aqueous working liquid contains water and electrochemically active organic molecules dissolved in the water. The electrochemically active organic molecules are functionalized with ionic groups. The polar gas collector section is configured to expose the aqueous working fluid to a mixed gas stream that contains some polar gas specie. The cathode of the electrochemical reactor is operable to chemically reduce the electrochemically active organic molecule, thereby electrochemically activating electrochemically active organic molecule for polar gas capture in the polar gas collector. The anode of the electrochemical reactor is operable to chemically oxidize the electrochemically active organic molecule, thereby electrochemically deactivating the electrochemically active organic molecule and releasing the polar gas species as gas. The polar gas discharge section is configured to emit the polar gas.

In a further embodiment of any of the foregoing embodiments, the polar gas is carbon dioxide.

A further embodiment of any of the foregoing embodiments includes a pump operable to pressurize the aqueous working liquid, and the pump is located between the anode inlet and the polar gas collector section.

In a further embodiment of any of the foregoing embodiments, the polar gas collector section includes a gas bubbler.

A further embodiment of any of the foregoing embodiments includes a valve located between the cathode outlet and the polar gas collector section.

In a further embodiment of any of the foregoing embodiments, the ionic groups include sulfonic acid.

In a further embodiment of any of the foregoing embodiments, the electrochemically active organic molecules are quinones and are selected from the group consisting of benzoquinone, naphthoquinone, anthraquinone, and combinations thereof.

In a further embodiment of any of the foregoing embodiments, the aqueous working liquid has a concentration of the electrochemically active organic molecules of 1 mol/L to 4 mol/L (moles per liter).

In a further embodiment of any of the foregoing embodiments, the electrochemically active organic molecules are benzoquinone disulfonic acid.

In a further embodiment of any of the foregoing embodiments, the ion-conducting membrane includes an ion-exchange polymer.

A method for separating carbon dioxide according to an example of the present disclosure includes dissolving electrochemically active organic molecules in water to form an aqueous working liquid by functionalizing the active organic molecules with one or more ionic groups. In a cathode of an electrochemical reactor, the organic molecules of the aqueous working liquid are electrochemically activated the for sorption of carbon dioxide and exposed to a mixed gas stream that contains carbon dioxide. The active organic molecules capture a least a portion of the carbon dioxide. In an anode of the electrochemical reactor, the organic molecules of the aqueous working liquid are electrochemically deactivated to release the captured carbon dioxide as gaseous carbon dioxide.

In a further embodiment of any of the foregoing embodiments, the ionic groups include sulfonic acid and the aqueous working liquid has a concentration of the electrochemically active organic molecules of 1 mol/L to 4 mol/L (moles per liter), and further comprising pressurizing the aqueous working liquid after exposing the activated active organic molecules of the aqueous working liquid to the mixed gas stream and before electrochemically deactivating the active organic molecules of the aqueous working liquid in the anode of the electrochemical reactor.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example of an electrochemical separator.

DETAILED DESCRIPTION

FIG. 1 schematically illustrates an electrochemical separator 20 ("separator 20"). As will be described, the disclosed separator 20 employs electrochemically active, stable quinone in high concentrations, without dissolution in a supporting electrolyte.

The separator 20 includes an electrochemical reactor 22 that has an anode 24 and a cathode 26. The anode 24 and cathode 26 are connected in an electrical circuit 27 with a power source, to provide input electrical power.

Although the arrangement of such reactors or cells may be varied, the anode 24 in this example includes an anode inlet 24a and an anode outlet 24a. The cathode 26 includes a cathode inlet 26a and a cathode outlet 26b. There is an ion exchange membrane 28 that separates the anode 24 and the cathode 26. For example, a proton exchange membrane 28 may be comprised of a perfluorinated sulfonic acid polymer or other ion-exchange material that is adapted to conduct protons and substantially block migration of larger molecules, as well as being non-conductive to electrons (i.e., is an electrical insulator). A single cell is shown, but the electrochemical reactor may consist of multiple cells, which may be arranged in a stack using interconnects and endplates as known to those skilled in the art. Similarly, the reactor 22 may comprise several stacks that can be electrically connected in series or in parallel by those skilled in the art.

The separator 20 includes a sorption circuit 30 and a desorption circuit 32. The sorption circuit 30 serves to collect, or absorb, carbon dioxide from a mixed gas stream, represented at G1, and the desorption circuit 32 serves to discharge carbon dioxide as an essentially pure stream, represented at G2, which may also contain water vapor.

The sorption circuit 30 includes a line 30a that is fluidly connected with the cathode outlet 26b and the anode inlet 24a. The sorption circuit 30 includes a carbon dioxide (polar) collector section 30b, which will be explained further below. The desorption circuit 32 includes a line 32a that is fluidly connected the anode outlet 24b and the cathode inlet 26a. The desorption circuit 32 includes a carbon dioxide (polar) discharge section 32b, which will also be described below. Although the examples herein are described with regard to carbon dioxide, it is to be understood that this disclosure is not limited and may be applied to other polar molecules.

The separator 20 also includes an aqueous working liquid 34 for circulation through the electrochemical reactor 22 via the sorption circuit 30 and the desorption circuit 32. The aqueous working liquid 34 is closed in the system. That is, the aqueous working liquid is not consumed in the process or removed from the separator 20. A small portion of the water in the aqueous working liquid 34 may be lost to evaporation over time. However, the water can be readily replaced as needed.

As will be appreciated, the sections 30b/32b in the illustrated example are external to the electrochemical reactor 22. Alternatively, the sections 30b/32b may be combined into the electrochemical reactor 22, wherein the electrochemical reactor 22 is configured for two-phase flow (e.g., the gas streams G1/G2 and the aqueous working liquid 34).

The aqueous working liquid 34 contains water and electrochemically active organic molecules of quinone dissolved in the water. Quinone alone has low solubility in water. In order to increase solubility, and thus the concentration of useable dissolved quinone in the aqueous working liquid 34, the quinone is functionalized with one or more ionic groups. The aqueous working liquid 34 is relatively non-volatile, non-flammable, and non-corrosive in comparison to other working fluids often used in electrolytic cells. For example, the aqueous working liquid 34 is free of strong acids, such as sulfuric acid, which often serve as electrolytes in other types of working fluids. In this regard, in some examples, the aqueous working liquid 34 may include only water, the quinone, and impurities.

The separator 20 may include one or more pumps 38 and valves 39 to transport the aqueous working liquid 34 through the sorption circuit 30, electrochemical reactor 22, and desorption circuit 32. Since the aqueous working liquid 34 is water-based, it has relatively low viscosity, which facilitates pumping and flow management.

The cathode 26 of the electrochemical reactor 22 is operable, with an input of electric power via the electrical circuit 27, to electrochemically reduce the quinone of the aqueous working liquid 34, to the corresponding hydroquinone thereby electrochemically activating the quinone for carbon dioxide capture in the carbon dioxide collector 30b. The anode 24 of the electrochemical reactor 22 is operable to electrochemically oxidize the hydroquinone of the aqueous working liquid 34, back to the corresponding quinone thereby electrochemically deactivating the quinone and releasing carbon dioxide as gas.

The electrochemical reactions in the electrochemical reactor 22 are:

At the cathode, the quinone is reduced to the corresponding hydroquinone:

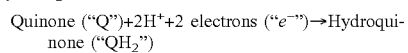
Quinone ("Q")+2H$^+$+2 electrons ("$e^-$")→Hydroquinone ("QH$_2$")

The electrons are driven by the power source through the external circuit 27, and the protons are transported though the membrane 28 to the anode. At the anode the opposite reaction occurs and the hydroquinone is oxidized back to the corresponding quinone:

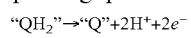
"QH$_2$"→"Q"+2H$^+$+2$e^-$

The composition of the aqueous working liquid 34 therefore is constant other than the change in the oxidation state (and the adsorption and desorption of carbon dioxide).

The carbon dioxide collector section 30b is configured to expose the aqueous working liquid 34 to the mixed gas stream G1 that contains carbon dioxide. Although not limited, in this example the carbon dioxide collector section 30b includes a gas bubbler 30c that is operable to release bubbles of the mixed gas G1 into the aqueous working liquid 34. Aqueous working liquid 34 that is activated in the cathode 26 flows to the carbon dioxide collector section 30b. The activated quinone (i.e., the hydroquinone) has an affinity to bond with carbon dioxide to which it is exposed.

The aqueous working liquid 34 with captured carbon dioxide then flows into the anode 24 of the electrochemical reactor 22, where the quinone is deactivated to release the captured carbon dioxide as gas. The carbon dioxide discharge section 32b is configured to emit the carbon dioxide gas, as the pure stream G2. For instance, the carbon dioxide discharge section 32b may include an open passage to siphon off the gaseous carbon dioxide or a membrane that is selectively permeable to carbon dioxide.

In further examples, the quinone of the aqueous working liquid 34 is selected from benzoquinones, naphthoquinones, anthraquinones, or combinations thereof. For example, a benzoquinone can be 1,4 benzoquinone or 1,2 benzoquinone, but the latter may be more favorable for functionalization. The functionalization is chosen to both enhance the solubility of the quinone, as well as provide ionic conductivity when it is dissolved in water.

In a further example, the functionalized quinone include ionic groups, such as one or more sulfonic acid groups. A functionalized 1,2 hydrobenzoquinone disulfonic acid is shown below as an example, as well as its oxidized counterpart 1,2 benzoquinone disulfonic acid. As shown in FIG. 1, the quinone is the deactivated reactant and the hydroquinone is the activated reactant.

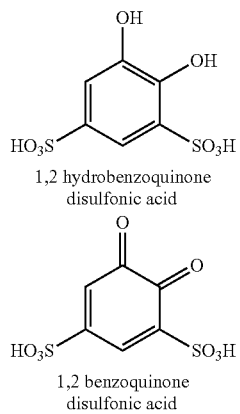

1,2 hydrobenzoquinone disulfonic acid 1,2 benzoquinone disulfonic acid

Another example would be an anthraquinone functionalized with sulfonate groups, such as 2,7 anthraquinone disulfonic acid. The 1,2 benzoquinone disulfonic acid has a higher reduction-oxidation potential than anthraquinone (approximately 0.8V versus 0.2V, as determined against a reversible hydrogen electrode). Therefore, the 2,7 anthraquinone disulfonic acid is more susceptible to oxidation in the presence of free oxygen, whereas the 1,2 benzoquinone disulfonic acid does not readily oxide in the presence of oxygen. Thus, 1,2 benzoquinone disulfonic acid may provide a more stable, electrochemically active aqueous working liquid 34.

The ionic group, such as the sulfonic acid group, enhances solubility of the quinone in water. As an example, the aqueous working liquid 34 has a concentration of the functionalized quinone of 1 mol/L to 3 mol/L (moles per liter). In some examples, the concentration may be greater than 1 mol/L, such as at least 2 mol/L or even 4 mol/L. The aqueous working liquid 34 thus has a high quinone concentration in comparison to the relatively low solubility of quinones dissolved in dilute acids (typically, 1 mol/L or less). The high concentration allows the aqueous working liquid 34 to adsorb more carbon dioxide per liter and it also enhances diffusion of the quinone in the electrochemical reactor 22, thus increasing reaction efficiency.

In addition to enhancing solubility in water, the sulfonic acid groups also serve as an ionic carrier, i.e., make the aqueous working liquid 34 an electrolyte. Thus, the quinone molecules have dual functionality as both the electroactive specie and as an ionic conductor. As a result of this functionalization of the quinone, a separate electrolyte, such as an acid, a base, or ionic liquid, need not be used.

The separator 20 may also represent a method for separating carbon dioxide. Such a method may include dissolving the electrochemically active organic molecules of quinone in water to form the aqueous working liquid 34 by functionalizing the quinone with the one or more ionic groups. In the cathode 26 of the electrochemical reactor 22, the quinone of the aqueous working liquid 34 is electrochemically activated for sorption of carbon dioxide. The activated quinone is then exposed to the mixed gas stream G1 that contains carbon dioxide. The quinone captures a least a portion of the carbon dioxide. The quinone is then electrochemically deactivated in the anode 24, to release the captured carbon dioxide as the pure carbon dioxide gas stream G2. This pure, or water saturated carbon dioxide stream can be used for a variety of purposes, such as the carbonation of water to make soda, as is well known by those skilled in the art.

In a further example, the separator 20 may be used in a contained, or self-contained, environment for carbon dioxide removal. For instance, the separator 20 may be employed on a space structure, submarine, airplane, or the like, where there is no ability, or at least very limited ability, to exchange "dirty" air that has high level of carbon dioxide with surrounding fresh air that has lower carbon dioxide. In such an implementation, the mixed gas stream G1 may be taken from within the contained environment, e.g., inside the space structure or submarine. The pure carbon dioxide gas stream G2 may be discharged to the surroundings, such as into space or into water. As will be appreciated, the separator 20 could also be used in the opposite scenario, to pump carbon dioxide from surrounding fresh air into a contained environment, such as a greenhouse.

In yet another example implementation, the separator 20 can be employed as a compression cycle, such as in a refrigerant system. In this regard, the pump 38 may be a high pressure pump that is located between the carbon dioxide collector section 30b and the anode inlet 24a. The aqueous working liquid 34 captures relatively low pressure carbon dioxide from the mixed gas stream G1. The gas stream G1 could also be a pure carbon dioxide stream. The pump 38 pressurizes the aqueous working liquid 34 that has captured carbon dioxide. The carbon dioxide is thus released in the anode 24 at the higher pressure, thereby discharging the pure carbon dioxide gas stream G2 at higher pressure than the mixed gas stream G1. Such an employment of the separator 20 may be more efficient than conventional carbon dioxide gas cycles, which are relatively energy-intensive in pressurizing gaseous carbon dioxide (a compressible gas). Pressurization of the aqueous working liquid 34 is also nearly isothermal, thereby reducing system temperature, as opposed to gaseous pressurization which significantly raises the temperature of the gas.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An electrochemical separator comprising:
   an electrochemical reactor having an anode including an anode inlet and an anode outlet, a cathode including a cathode inlet and a cathode outlet, and an ion-conducting membrane separating the anode and the cathode;
   a sorption circuit fluidly connected with the cathode outlet and the anode inlet, the sorption circuit including a polar gas collector section;
   a desorption circuit fluidly connected the anode outlet and the cathode inlet, the desorption circuit including a polar gas discharge section; and
   an aqueous working liquid for circulation through the sorption circuit and the desorption circuit, the aqueous working liquid containing water and electrochemically active organic molecules dissolved in the water, wherein the organic molecules are quinone molecules that are functionalized with at least one sulfonic acid group in which a sulfur atom of the at least one sulfonic acid group is bonded to a carbon atom of the quinone molecule.

2. The electrochemical separator as recited in claim 1, wherein the electrochemically active organic molecules are polar molecules in either the reduced or oxidized state and are non-polar molecules in the other of the reduced or oxidized state.

3. The electrochemical separator as recited in claim 1, wherein the reactor includes an ion-conducting membrane.

4. The electrochemical separator as recited in claim 3, wherein the ion-conducting membrane includes an ion-exchange polymer.

5. The electrochemical separator as recited in claim 1, wherein the quinone molecules are selected from the group consisting of benzoquinone, naphthoquinone, anthraquinone, and combinations thereof.

6. The electrochemical separator as recited in claim 1, wherein the aqueous working liquid has a concentration of the electrochemically active organic molecules of 1 mol/L to 4 mol/L (moles per liter).

7. The electrochemical separator as recited in claim 1, wherein the aqueous working liquid has a concentration of the electrochemically active organic molecules of at least 1.5 mol/L (moles per liter).

8. The electrochemical separator as recited in claim 1, wherein the electrochemically active organic molecules are benzoquinone disulfonic acid.

9. The electrochemical separator as recited in claim 1, wherein the quinone molecules are selected from naphthoquinone, anthraquinone, and combinations thereof.

10. The electrochemical separator as recited in claim 9, wherein the aqueous working liquid has a concentration of the quinone molecules of 1 mol/L to 4 mol/L (moles per liter).

11. The electrochemical separator as recited in claim 1, wherein the aqueous working liquid consists of the water and the quinone molecules functionalized with the at least one sulfonic acid group.

12. An electrochemical separator comprising:
    an electrochemical reactor having an anode including an anode inlet and an anode outlet, a cathode including a cathode inlet and a cathode outlet, and an ion-conducting membrane separating the anode and the cathode;
    a sorption circuit fluidly connected with the cathode outlet and the anode inlet, the sorption circuit including a polar gas collector section;
    a desorption circuit fluidly connected the anode outlet and the cathode inlet, the desorption circuit including a polar gas discharge section;
    an aqueous working liquid for circulation through sorption circuit and the desorption circuit, the aqueous working liquid containing water and electrochemically active organic molecules dissolved in the water, wherein the electrochemically active organic molecules are quinone molecules that are functionalized with at least one sulfonic acid group in which a sulfur atom of the at least one sulfonic acid group is bonded to a carbon atom of the quinone molecule, and wherein
    the polar gas collector section is configured to expose the aqueous working fluid to a mixed gas stream that contains some polar gas specie,
    the cathode of the electrochemical reactor operable to chemically reduce the electrochemically active organic molecule, thereby electrochemically activating electrochemically active organic molecule for polar gas capture in the polar gas collector,
    the anode of the electrochemical reactor operable to chemically oxidize the electrochemically active organic molecule, thereby electrochemically deactivating the electrochemically active organic molecule and releasing the polar gas species as gas, and
    the polar gas discharge section is configured to emit the polar gas.

13. The electrochemical separator as recited in claim 12, wherein the polar gas is carbon dioxide.

14. The electrochemical separator as recited in claim 12, further comprising a pump operable to pressurize the aqueous working liquid, and the pump is located between the anode inlet and the polar gas collector section.

15. The electrochemical separator as recited in claim 12, wherein the polar gas collector section includes a gas bubbler.

16. The electrochemical separator as recited in claim 12, further comprising a valve located between the cathode outlet and the polar gas collector section.

17. The electrochemical separator as recited in claim 12, wherein the quinone molecules are selected from the group consisting of benzoquinone, naphthoquinone, anthraquinone, and combinations thereof.

18. The electrochemical separator as recited in claim 12, wherein the aqueous working liquid has a concentration of the electrochemically active organic molecules of 1 mol/L to 4 mol/L (moles per liter).

19. The electrochemical separator as recited in claim 12, wherein the electrochemically active organic molecules are benzoquinone disulfonic acid.

20. The electrochemical separator as recited in claim 12, wherein the ion-conducting membrane includes an ion-exchange polymer.

\* \* \* \* \*